(12) United States Patent
Tailliet (10) Patent No.: US 12,512,160 B2
(45) Date of Patent: Dec. 30, 2025

(54) DEVICE OF THE EEPROM MEMORY TYPE WITH AN ARCHITECTURE OF THE SPLIT VOLTAGE TYPE

(71) Applicant: STMicroelectronics (Rousset) SAS, Rousset (FR)

(72) Inventor: Francois Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 209 days.

(21) Appl. No.: 18/243,193

(22) Filed: Sep. 7, 2023

(65) Prior Publication Data
US 2024/0087652 A1    Mar. 14, 2024

(51) Int. Cl.
| | | |
|---|---|---|
| G11C 16/10 | (2006.01) | |
| G11C 16/04 | (2006.01) | |
| G11C 16/08 | (2006.01) | |
| G11C 16/16 | (2006.01) | |

(52) U.S. Cl.
CPC ........ *G11C 16/102* (2013.01); *G11C 16/0433* (2013.01); *G11C 16/08* (2013.01); *G11C 16/16* (2013.01)

(58) Field of Classification Search
CPC ... G11C 16/102; G11C 16/0433; G11C 16/08; G11C 16/16
USPC .................................................. 365/189.011
See application file for complete search history.

(56) References Cited

U.S. PATENT DOCUMENTS

| | | | |
|---|---|---|---|
| 5,434,815 A | | 7/1995 | Smarandoiu et al. |
| 5,917,770 A | * | 6/1999 | Tanaka ............... G11C 8/10 365/230.01 |
| 2001/0021128 A1 | | 9/2001 | Kim |
| 2009/0002027 A1 | * | 1/2009 | Lee ............... H03K 3/356113 326/80 |
| 2016/0148697 A1 | * | 5/2016 | Tailliet ............... G11C 5/025 365/185.11 |
| 2019/0109588 A1 | * | 4/2019 | Lee ............... H03K 19/017509 |
| 2020/0342943 A1 | | 10/2020 | Tailliet et al. |

OTHER PUBLICATIONS

Digital Circuits, Chapter 10 Multivibrators, "The S-R Latch," 6 pgs., 2022.
INPI Search Report and Written Opinion for priority application, FR 2209003, report dated Mar. 15, 2023, 9 pgs.

* cited by examiner

*Primary Examiner* — Alexander Sofocleous
*Assistant Examiner* — Duy H Luong
(74) *Attorney, Agent, or Firm* — Crowe & Dunlevy LLC (57) ABSTRACT

A nonvolatile memory device has a "split-voltage" architecture and includes columns of memory words formed on each row by groups of memory cells. All state transistors for memory cells of a memory word are gate controlled by a control element. All control elements of a same row are controlled by a first control signal generated by a first row control circuit in response to a set-reset (SR) latch output signal output for a selected row. In order to write a piece of data in a memory word, the first row control circuit confers onto the first control signal an erasing voltage corresponding to a first logic state of the first control signal and then a programming voltage corresponding to a second logic state of the first control signal without modifying, between erasing and programming the memory word, the state of the latch output signal for the selected row.

17 Claims, 5 Drawing Sheets

DEVICE OF THE EEPROM MEMORY TYPE WITH AN ARCHITECTURE OF THE SPLIT VOLTAGE TYPE

PRIORITY CLAIM

This application claims the priority benefit of French Application for Patent No. 2209003, filed on Sep. 8, 2022, the content of which is hereby incorporated by reference in its entirety to the maximum extent allowable by law.

TECHNICAL FIELD

Implementations relate to non-volatile memories, for example electrically erasable programmable (EEPROM) memories, in particular the memories having an architecture of the "split voltage" type for their erasing operation and their programming operation, and more particularly the control of the signals controlling, through control elements of the inverter type, the gates of the state transistors of the memory cells of the memory words during the cycles of writing including erasing of these memory words followed by programming of these memory words.

BACKGROUND

In EEPROM memories, the logic value of a bit stored in a memory point is represented by the value of the threshold voltage of a floating-gate transistor, which can be modified as much as desired by programming or erasing operations. The programming or the erasing of a floating-gate transistor includes the injection or the extraction of the electric charges in the gate of the transistor by tunnel effect (referred to in the art as the "Fowler-Nordheim" effect) via a high voltage.

During erasing, this high voltage can be approximately 9 to 20 volts, for example 15 volts.

This high voltage, necessary for the writing of EEPROM memories, is very constraining in terms of the technological process and the reliability of the product.

Indeed, lithographical reduction, that is to say the increase in the etching fineness, leads to a decrease in the operating voltages, and this high voltage becomes more problematic in terms, in particular, of leaks of the source/substrate and drain/substrate junctions or located in the channel between drain and source of the transistors as well as in terms of stresses on the gate oxides ("gate stress"), or even of breakdown of these gate oxides, of the transistors.

Consequently, these risks of premature ageing and/or of breakdown of the transistors have a direct impact on the reliability of the product.

This is why the solution referred to as "split voltage" mentioned above can be used. More precisely, the high voltage necessary for the programming of the memory planes is split between a positive voltage and a negative voltage so that the difference between the positive voltage and the negative voltage corresponds to a sufficient high programming voltage.

Such a solution allows a relaxing of the stress on the voltage resistance of the transistors.

The control in X (rows) direction is more complex in an architecture of the split voltage type than in a conventional architecture since two different signals must be decoded per physical row of memory cells, namely the signal for controlling the word lines that control the gates of the access (or selection) transistors of the memory cells, and the signals for controlling the gates of the state transistors of the memory cells of the memory words through inverter control elements.

There is therefore a need to improve the row control circuits of the non-volatile memories having a split-voltage architecture, in particular in terms of current consumption and number of transistors.

SUMMARY

According to one aspect, a non-volatile memory device with an architecture of the split voltage type is proposed, for example a memory of the EEPROM type.

This memory device comprises a matrix memory plane including columns of memory words.

These memory words are formed respectively on each row of the memory plane by groups of memory cells (each memory cell forming 1 bit of the memory word).

Each memory cell includes a state transistor having a control gate and a floating gate and a selection or access transistor.

All the state transistors of the memory cells of a memory word are controlled on the gate by a control element (typically an inverter).

All the control elements of the same row are controlled by a first control signal coming from a first latch device of the SR type ("flip flop"), associated with said row.

The memory device also comprises a row decoder configured to, in order to write a piece of data in a memory word, select the row containing this memory word.

The memory device also comprises a first row control circuit, associated with said selected row, and configured to, in order to write the piece of data in the memory word, confer onto the first control signal an erasing voltage corresponding to a first logic state of the first control signal then a programming voltage corresponding to a second logic state of the first control signal, without modifying the state of the output terminal of the first latch device associated with this selected row between the erasing and the programming of the memory word.

Thus, in practice, the first latch device is powered between a first power supply voltage or high voltage and a second power supply voltage or low voltage.

During an erasing operation, the high voltage is typically approximately 15 volts while the low voltage is type approximately 3 volts.

During a programming operation, the high voltage is typically approximately 3 volts while the low voltage is typically a negative voltage for example equal to −5 volts.

Thus, for a selected row, during a writing cycle, including an erasing followed by a programming, the first control signal successively goes from the low logic state (corresponding to the low voltage) to the high logic state (corresponding to the high voltage), even though the value of this high voltage is equal here to the value of the low voltage in the erasing operation.

And, here, the switch between the logic state of the first control signal in the erasing operation and the logic state of this control signal in the programming operation is carried out without modifying the state of the output terminal of the first latch device associated with this selected row between the erasing and the programming, whereas in the prior art, the logic state of this output terminal was modified between the erasing and the programming.

In the prior art this resulted in a risk of collapse of the latch device power supply voltage associated with the control elements connected to the gates of the state transistors with risks of incorrect switching of the output state of the latch device as well as peaks of current in the middle of the writing cycle.

This also results here in a reduction of the current consumption.

According to one implementation, the first row control circuit includes a first control circuit having a first circuit input connected to the output terminal of the first latch device, a second circuit input configured to receive a first control signal and a first circuit output configured to deliver the first control signal, the logic state of which depends on the value of the first control signal, and a first control stage configured to deliver this first control signal.

Thus, here, the switching of the logic state of the first control signal is carried out by a control circuit connected downstream of the latch device.

According to one implementation, the first control circuit includes: a logic gate of the exclusive NOR type having a first gate input connected to said first circuit input, a second gate input connected to the second circuit input and a gate output; and a first inverter connected between the gate output and the first circuit output.

Thus, in this implementation, the switching of the logic state of the first control signal is carried out using an exclusive NOR logic gate connected downstream of the latch device.

The lines delivering the first respective control signals are rather capacitive and their switching causes significant current draws. The most compact exclusive NOR gates use six transistors with the disadvantage of transmitting the output current to the input. It is therefore advantageous to avoid this.

The presence of an inverter at the output of the exclusive NOR gate allows to reach this goal. Indeed, the inverter behaves like an output buffer stage. Thus, the switching current on the line carrying the first control signal is not seen by the output of the exclusive NOR gate and thus not seen on the inputs of this gate.

This exclusive NOR gate-inverter assembly can be carried out with eight transistors (six for the gate and two for the inverter), which is particularly compact.

For comparison, an exclusive OR gate (equivalent from the logic point of view to the exclusive NOR gate-inverter assembly) carried out with a schema that does not transmit the output current to its inputs would require the use of a number of transistors greater than eight.

According to one implementation, the memory plane comprises R rows and the memory device comprises: M first latch devices, each first latch device being associated with a block of N rows, R being equal to the product of N by M, as well as, for each first latch device, N first row control means respectively associated with the N rows of the block of rows associated with this first latch device.

The row decoder thus includes a block decoding circuit configured to select a first latch device out of the M first latch devices and a first row decoding circuit configured to select a row out of the N rows of the block of rows associated with the first latch device selected.

According to one implementation, the block decoding circuit is connected to the setting input of each first latch device and the first row decoding circuit includes in each first control circuit a first logic gate connected at the input on the one hand to the first circuit input and on the other hand to a first decoding input capable of receiving a row decoding signal, this first logic gate being connected at the output to the second input of the exclusive NOR logic gate.

According to one implementation, all the selection transistors of the memory cells of the same row are controlled by a second control signal coming from a second latch device of the SR type associated with said row.

The row decoder is then configured to, in order to program a piece of data in a memory word, select the row containing this memory word and the memory device then comprises a second row control circuit, associated with said selected row, and configured to, in order to program the piece of data in the memory word, confer onto the second control signal a selection voltage.

The second row control circuit advantageously include a second control circuit having a first circuit input connected to the output terminal of the second latch device and a second circuit output configured to deliver the second control signal.

Here again, this second control circuit is connected downstream of the second latch device.

And, the second control circuit advantageously includes here a second inverter, the output of which is connected to the second circuit output.

According to one implementation, each pair formed by the first latch device and the second latch device is associated with the same block of N rows.

The memory device thus includes for each second latch device N second row control circuits respectively associated with the N rows of the block of rows associated with this second latch device and the row decoder includes, besides the block decoding circuit configured to select a pair of first and second latch devices out of the M pairs, a second row decoding circuit configured to select a row out of the N rows of the block of rows associated with the second latch device selected.

According to one implementation, the block decoding circuit is connected to the input of the setting of each second latch device and the second row decoding circuit includes in each second control circuit a second logic gate connected at the input on the one hand to the first circuit input and on the other hand to a second decoding input capable of receiving a row decoding signal, this second logic gate being connected at the output to the second inverter.

The first logic gate and the second logic gate are advantageously NAND gates.

It is possible to use any type of conventional latch device known per se, for example such as those which use a schema with 6 transistors of the volatile memory point (SRAM) type.

Such latch devices are set or reset under the nominal power supply voltage Vdd of the integrated circuit, which requires a conductivity of the N channels of the NMOS transistors much greater than the conductivity of the P channels of the PMOS transistors.

This conductivity condition is obtained by adjusting the width/length (W/L) ratio of the transistors.

However, in the future it is suitable to use low-consumption memories powered under a voltage Vdd of approximately 1.2 volts or even less.

However, the conductivity condition mentioned above imposes, for slow NMOS transistors and fast PMOS transistors, having a large channel length for the PMOS transistors or a large channel width for the NMOS transistors.

It is therefore necessary to dimension the transistors as indicated above in case certain transistors effectively produced turned out to be slow NMOS transistors and/or fast PMOS transistors.

This thus leads to an increase in the size of the transistors as well as significant gate capacitances.

Moreover, if certain transistors effectively produced turned out to be fast NMOS transistors and/or slow PMOS transistors, a slow switching of the latch device between the delivery of the high voltage and the delivery of the low voltage and vice versa would be obtained, since the PMOS transistors would thus be under-dimensioned and would therefore lead to a very low current.

Thus, the current latch devices of the SRAM type cannot operate at a voltage Vdd that is equal to the greatest value between the threshold voltage of the NMOS transistors and the absolute value of the threshold voltage of the PMOS transistors.

Moreover, they have a very unstable operation at a low voltage Vdd in the extreme configurations of transistors (quickness or slowness of the MOS transistors), which leads to an increase in the gate surface and to an increase in the risk of breakdown of the gate oxide, as well as in certain cases to a long switching time.

It is therefore preferable, in certain uses, to use a compact latch device, capable of operating at a low voltage Vdd, not having a current conflict between NMOS and PMOS transistors, and configured to reduce as much as possible the stresses in the gate oxides ("gate stress") of the PMOS transistors, for example such as a latch device of the type of that described in the French Application for Patent No. 2205502 to which a person skilled in the art can optionally refer and the contents of which are incorporated for all practical purposes into the present description.

Thus, it is advantageously proposed to use an SR latch flip-flop, controllable, entirely CMOS, in combination with a control module configured to manage the setting and the resetting of the flip-flop as well as the values and the temporal sequence of the various voltages used by the flip-flop in its various operating phases.

According to one implementation, the latch device will, on command, deliver and maintain on its output terminal either a high voltage, for example 15 volts, or a low voltage, for example 3.5 volts.

The latch device according to this implementation comprises a latch flip-flop configured to be powered between a first power supply voltage and a second power supply voltage lower than the first power supply voltage.

The latch flip-flop has a first and a second flip-flop inputs and a flip-flop output connected to the output terminal of the latch device.

The latch device also comprises a control module that is configured: to position the latch flip-flop in a set state or in a reset state when the first power supply voltage has a first value (for example a value Vdd equal to 1.2 volts or even less) lower than the low voltage; and then position the latch flip-flop to confer the high voltage onto the first power supply voltage and the low voltage onto the second power supply voltage and to simultaneously deliver starting from a delivery time, to the two flip-flop inputs, two input voltages corresponding in theory to a forbidden logic state, in delivery conditions such that these two input voltages do not translate in reality for said flip-flop into the forbidden logic state, so as to deliver and maintain on the flip-flop output the high voltage or the low voltage (according to the initial "set" or "reset" positioning of the flip-flop).

A person skilled in the art knows that a forbidden logic state for an SR flip-flop translates into the simultaneous application of a setting (set) and resetting condition to the two flip-flop inputs.

When the SR flip-flop includes NOR logic gates, this forbidden logic state translates into the application of two voltages to the two flip-flop inputs seen by the NMOS transistors of the flip-flop, the gates of which are connected to these two flip-flop inputs, as "1" logic states.

But the conditions of delivery of these two input voltages are such that they allow to avoid in reality the forbidden logic state.

For example, these delivery conditions include the satisfaction at said time of delivery and later of a relationship between the values of these two input voltages, the value of the second power supply voltage and the threshold voltage of the NMOS transistors of the flip-flop, the gates of which are connected to the two flip-flop inputs.

The high voltage and the low voltage have values corresponding to those used in phases of erasing or of programming non-volatile memory cells.

The first value of the first power supply voltage is at least equal to the largest value out of the threshold voltage of the NMOS transistors and the absolute value of the threshold voltage of the PMOS transistors of the latch device.

Moreover, it is advantageously less than or equal to 1.2 volts.

According to one implementation, the latch flip-flop includes a first logic gate and a second logic gate, advantageously NOR gates.

According to one implementation, the first logic gate has a first gate input coupled to the first flip-flop input, a second gate input and a first gate output.

The second logic gate has a first gate input coupled to the first gate output, a second gate input coupled to the second flip-flop input and a second gate output coupled to the second gate input of the first logic gate as well as to the flip-flop output.

The first and second logic gates include NMOS transistors having their gate connected to the first flip-flop input or to the second flip-flop input and the control module is advantageously configured to, when the flip-flop is positioned (in its set or reset state), deliver starting at said time of delivery, on each flip-flop input, said corresponding input voltage having a value lower than the value of the second power supply voltage increased by the threshold voltage of the NMOS transistors.

This allows to obtain a gate-source voltage of these transistors lower than their threshold voltage, which blocks them and thus avoids the forbidden logic state of the flip-flop while avoiding the leaks of these NMOS transistors.

It would be possible to deliver at said time of delivery and at least temporarily, on each flip-flop input, said input voltage having a value equal to the value of the second power supply voltage increased by the threshold voltage of the NMOS transistors. A forbidden logic state would still not be obtained since such input voltages would not be seen as representative of a "1" logic state but this would engender leaks of current at the NMOS transistors.

According to one implementation, the control module includes a first NAND logic gate, capable of being powered between a first auxiliary voltage and a second auxiliary voltage.

The first logic gate has a first gate input configured to receive a logic signal for setting the latch flip-flop, a second gate input configured to receive a control signal, and a first gate output coupled to the first flip-flop input.

The control module also includes a second NAND logic gate, configured to be powered between the first auxiliary voltage and the second auxiliary voltage.

This second NAND logic gate has a first gate input configured to receive the control signal, a second gate input configured to receive a logic signal for setting the latch flip-flop, and a second gate output coupled to the second flip-flop input.

The control module also includes a control circuit configured to, according to various operating phases of the flip-flop (for example flip-flop in the inactive state, set the flip-flop, reset the flip-flop, and once the flip-flop has been set or reset, deliver and maintain at the output the high voltage or the low voltage of the latch flip-flop), assign a logic value to the control signal, deliver the setting signal in its active or inactive logic state, deliver the resetting signal in its inactive or active logic state, and manage the values of the first power supply voltage, of the second power supply voltage, of the first auxiliary power supply voltage and of the second auxiliary power supply voltage.

BRIEF DESCRIPTION OF THE DRAWINGS

Other advantages and features of the invention will appear upon examination of the detailed description of embodiments and implementations, in no way limiting, and of the appended drawings in which.

DETAILED DESCRIPTION

Figure 1:
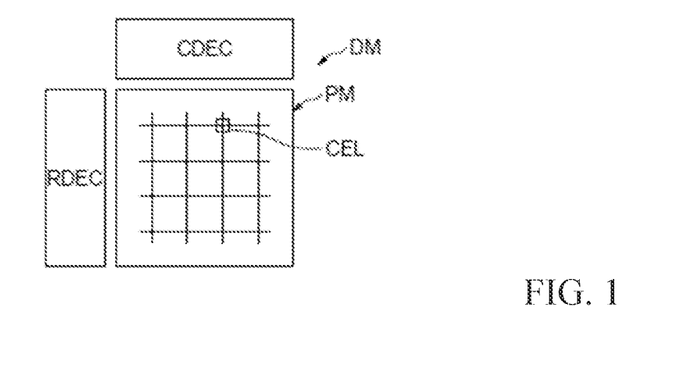
FIG. 1 shows a block diagram of a non-volatile memory device.

In FIG. 1, the reference DM designates a non-volatile memory device with an architecture of the split voltage type comprising a matrix memory plane PM including rows and columns of memory cells CEL.

A row decoder RDEC as well as a column decoder CDEC, having a conventional structure, are associated with this memory plane PM.

The row decoder, for which an example of structure will be described in more detail below, is configured to select a row of the memory plane.

Figure 2:
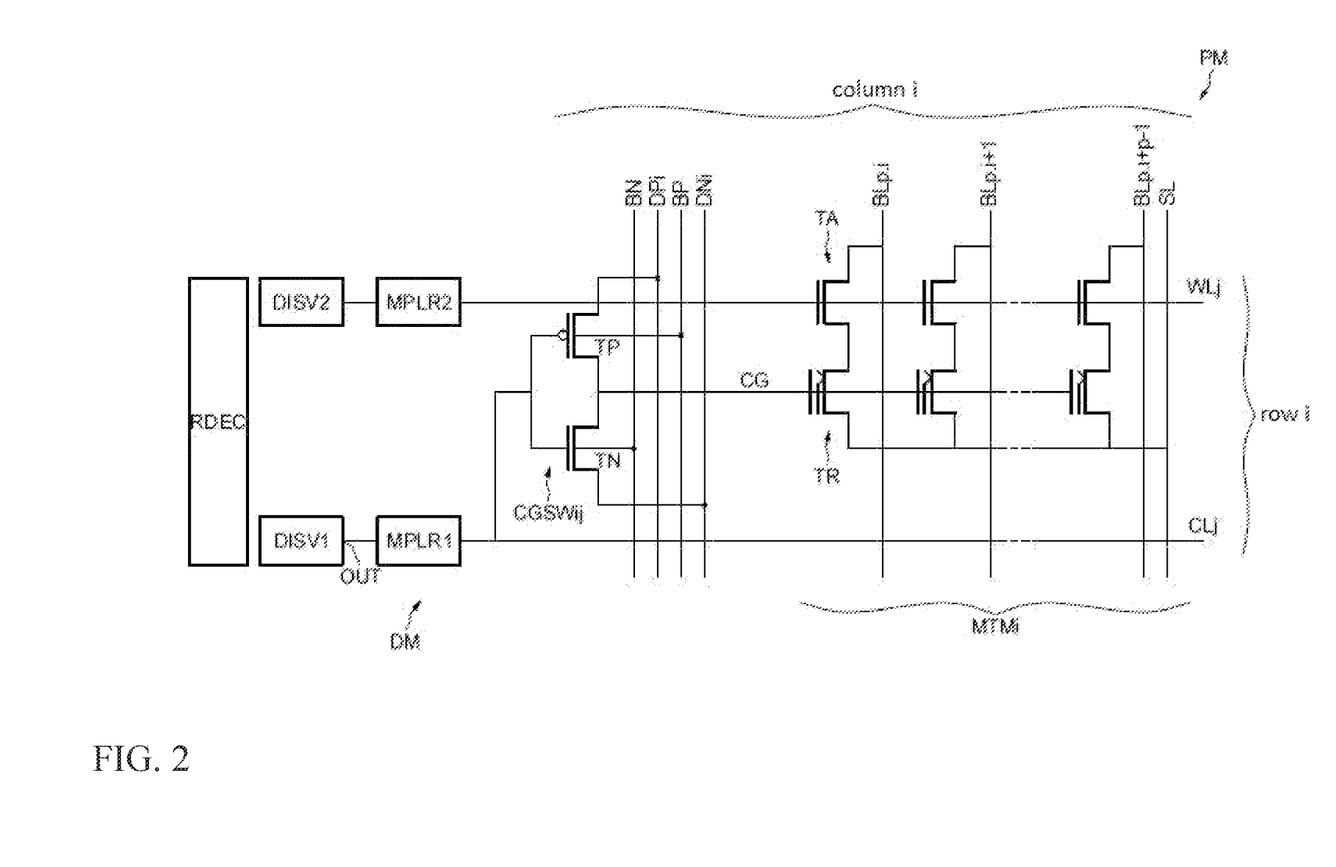
FIG. 2 is a schematic diagram of the non-volatile memory device.

As schematically illustrated in FIG. 2, each memory cell includes an access or selection transistor TA and a state transistor TR having a floating gate and a control gate.

All the access transistors TA of the same row j of cells are connected by their respective gates to a word line WLj and are controlled on their gates by a signal WLj (for simplification purposes, the word line and the signal delivered on this word line will be designated by the same reference WLj).

The sources of the state transistors TR are connected to a controlled source line SL, the potential of which is typically grounded during the operation phases of data erasing or data reading the memory cells but which is positive by approximately several volts during the operation phase of programming the memory cells.

As illustrated in this FIG. 2, the memory plane PM typically comprises memory words MTMi in each row. Each memory word MTMi includes several memory cells, here p memory cells.

These are thus called columns of memory words.

Thus, the memory words MTMi located in each row belong to the column i of memory words and the access transistors TA of the p memory cells of these memory words MTMi are respectively connected to bit lines BLp.i, BLp.i+1, ..., BLp.i+p−1.

As indicated above, the source line SL, dedicated to the column i and thus to the corresponding memory word MTMi, connects the sources of the state transistors TR of the memory word MTMi.

All the state transistors TR of the memory cells of a memory word MTMi are controlled on their gates by a control element CGSWij including here an inverter including an NMOS transistor TN and a PMOS transistor TP.

And, all the control elements CGSWij of the same row j are controlled by a first control signal CLj delivered on a line CLj (here again, for simplification purposes, the reference CLj of the line corresponds to the reference of the control signal carried on this line).

As will be shown in more detail below, this first control signal CLj comes from a first latch device of the SR type, labelled DISV1, associated with the row j, via first row control circuit MPLR1.

Likewise, the second control signal WLj comes from a second latch device of the SR type, labelled DISV2, via a second row control circuit MPLR2.

If the inverter forming control element CGSWij is now considered again, it is clear that the input of this inverter is controlled by the first control signal CLj.

The substrate of the transistor TP is biased by a voltage BP and the substrate of the transistor TN is biased by a voltage BN.

Moreover, the source of the transistor TP is biased by a voltage DPi and the source of the transistor TN is biased by a voltage DNi.

As will be seen in more detail below, in order to write a piece of data in the memory word MTMi: the row decoder RDEC is configured to select the row j containing this memory word, and the first row control circuit MPLR1, associated with this selected row j, is configured to confer onto the first control signal CLj an erasing voltage corresponding to a first logic state of the first control signal CLj and then a programming voltage corresponding to a second logic state of the first control signal CLj, without modifying the state of the output terminal OUT of the first latch device DISV1 associated with this selected row j between the erasing and the programming of the memory word MTMi.

The values of the various voltages of this control signal CLj corresponding to its respective logic states will be returned to in more detail below.

Figure 3:
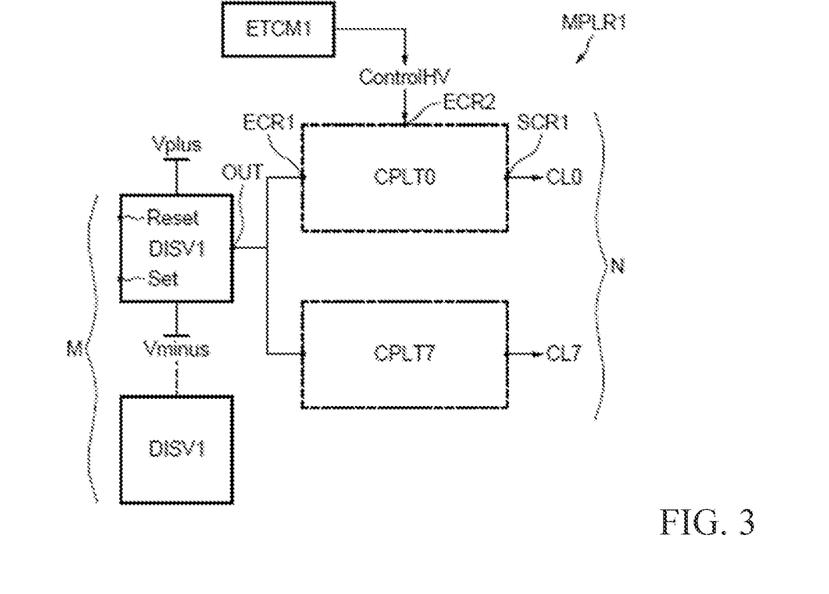
FIG. 3 is a schematic diagram of the association of a first latch device with multiple rows of the non-volatile memory device.

Although it is possible to provide a first latch device and first row control circuit per row j, it is particularly advantageous to provide, as illustrated very schematically in FIG. 3, a first latch device DISV1 associated with N rows, for example eight rows.

Thus, if the memory plane PM includes R rows, with R equal to the product of M by N, there are thus M blocks of N rows and M first latch devices DISV1 respectively associated with the M blocks of N rows.

The first row control circuit MPLR1 thus includes N structurally identical first control circuits CPLT0-CPLT7 (N is equal to 8 here), each having a first circuit input ECR1 connected to the output terminal OUT of the corresponding first latch device DISV1. Moreover, each first control circuit has a circuit output SCR1 delivering the corresponding first control signal CLj (j=0 to 7).

Each first control circuit CLPTi also includes a second circuit input ECR2 configured to receive a first control signal controlHV delivered by a first control stage ETCM1.

And, as will be seen in more detail below, the logic state of the first control signal CLj depends on the value of the first control signal controlHV.

The first latch device DISV1 includes a setting input Set and a resetting input Reset.

The latch device DISV1 is moreover powered between a first power supply voltage Vplus and a second power supply voltage Vminus which is lower than the power supply voltage Vplus.

In erasing, once the latch device DISV1 has been set, the first power supply voltage Vplus rises to a high-voltage value, for example 15 volts, while the second power supply voltage Vminus rises to a low voltage, for example 3 volts.

For a selected row j, the voltage of the first control signal CLj, associated with this selected row, is equal to the low voltage, or 3 volts in this example. This thus corresponds to a low logic state.

During the programming operation that follows the erasing operation in the cycle of writing of the memory word considered, the first power supply voltage Vplus is equal for example to 3 volts while the second power supply voltage Vminus is a negative voltage, for example equal to −5 volts.

And, for a selected row j, the value of the voltage of the signal CLj delivered on this selected row is equal, in the programming step, to 3 volts, which corresponds to the programming high voltage Vplus. The first control signal CLj thus now has the high logic state.

It is thus clear that between the erasing step and the programming step, the logic state of the first control signal has changed.

It went from the low logic state to the high logic state.

However, as will be seen in more detail below, this has been carried out without the logic state of the output signal delivered on the output terminal OUT of the first latch device DISV1 having changed.

Indeed, this change in logic state of the first control signal CLj was carried out via the value of the first control signal controlHV.

During the erasing operation, the selection of the column i containing the memory word MTMi is carried out using the value of the voltage Dpi.

More precisely, for a selected column, the value Dpi is equal to the high voltage, for example 15 volts, while for a non-selected column and a selected row, the value of this voltage is equal to 3 volts.

For the programming operation, the selection of the column i containing the word MTMi located in the selected row is carried out via the value of the voltage DNi.

More precisely, this voltage is equal to −5 volts to select the column i of the selected row j while it is equal to 3 volts to not select the column i of a selected row.

As for the values of the substrate voltages BN and BP, they are respectively equal to 3 volts and 15 volts for an erasing operation, whether this is for a column and/or a row selected or not.

For the programming operation, the values of the voltages BN and BP are respectively equal to −5 volts and 3 volts whether this is for the selection or the non-selection of a column and/or of a row.

Figure 4:
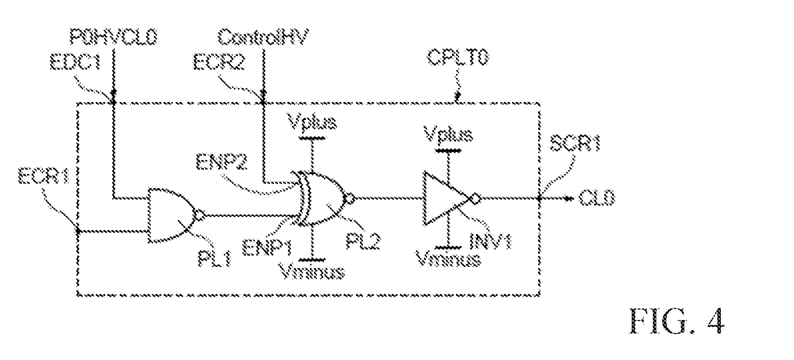
FIG. 4 is a schematic diagram of a first control stage of the non-volatile memory device.

Reference is now made more particularly to FIG. 4 to describe an exemplary embodiment of a first control stage CPLT0.

The latter includes a logic gate PL2 of the exclusive NOR type having a first gate input ENP1 connected to the first circuit input ECR1, via a NAND logic gate PL1 and a second gate input ENP2 connected to the second circuit input ECR2, as well as a gate output connected to the input of a first inverter INV1, the output of which is connected to the first circuit output SCR1.

The logic gate PL1 also receives on its other input, connected to a first decoding input EDC1, a first decoding signal P0HVCL0 allowing to select or not the row associated with this first control circuit CPLT0.

The logic gate PL1 thus forms a first row decoding circuit and allows, in combination with the first row decoding signal P0HVCL0, to select this row or not.

More precisely, if the logic value of the first decoding signal P0HVCL0 is equal to 1, the row is selected. However, if this logic value is equal to 0, the row is not selected.

Figure 5:
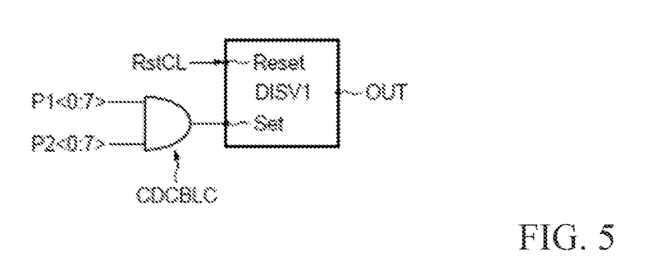
FIGS. 5 and 6 are schematic diagrams of a row decoder including a block decoding circuit of the non-volatile memory device.

If reference is now made more particularly to FIG. 5, it is clear that the row decoder includes a block decoding circuit CDCBLC, including here an AND logic gate, connected at the output to the setting input Set of the first latch device DISV1.

In this example, a first input of the AND gate CDCBLC receives a wire P1 out of eight. A second input receives a wire P2 out of eight which allows to select a latch device DISV1 out of M (M=64 here) devices.

The combination of this gate CDCBLC and of the NAND gate PL1 of the control circuit CPLT1 thus allow to select a row out of 512 rows.

The resetting input Reset of the first latch device DISV1 is capable of receiving a resetting signal RstCL.

As indicated above, a cycle of writing in a memory word starts by a phase of erasing this memory word.

In this respect, for the erasing, after the first latch device has been set, it delivers on its output terminal OUT the voltage Vplus (15 volts). The logic output of the output terminal OUT is thus in the high state.

The corresponding row having been selected (the signal P0HVCL0=1), the output of the NAND gate PL1 is equal to 0.

The first control signal controlHV also has a low logic state. Consequently, the output of the exclusive NOR gate PL2 has a high logic state (the voltage delivered is the voltage Vplus equal to 15 volts).

Consequently, the output of the inverter INV1 is in the low state (voltage equal to 3 volts). Consequently, the first control signal CL0 has a low logic state and a voltage equal to Vminus (3 volts).

For the programming phase, the first latch device DISV1 is this time powered between the voltage Vplus (3 volts) and the voltage Vminus (−5 volts). The output of the first latch device delivers the voltage Vplus (3 volts) which corresponds here again to a high logic state of this output signal.

The output of the NAND logic gate PL1 is thus still equal to 0. However, this time, the first control signal controlHV has a voltage equal to Vplus which corresponds to its high logic state. Consequently, the output of the logic gate PL2 is in the low logic state. Consequently, the output of the first inverter INV1 is in the high logic state (it has the voltage Vplus equal to 3 volts).

The same is true for the first control signal CL0 which has the voltage Vplus corresponding to the high state of this signal.

There has therefore indeed been between the erasing and the programming of the memory word a modification of the logic state of the first control signal CL0 without modification of the logic state of the output terminal OUT of the first latch device DISV1.

Figure 6:
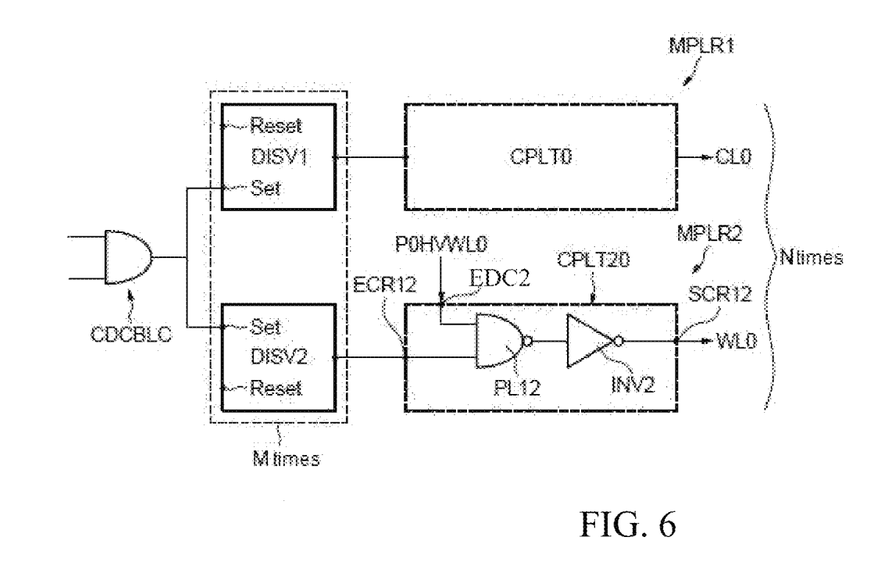

Reference is now made more particularly to FIG. 6.

All the selection transistors of the memory cells of the same row are controlled by a second control signal WL0 (for the row 0). This second control signal comes from a second latch device of the SR type DISV2, which can have a structure analogous to that of the first device DISV1.

In order to program a piece of data in a memory word, the row decoder is configured to select the row containing this memory word, and, as illustrated in FIG. 2, a second row control circuit MPLR2 associated with the selected row is configured to confer onto the second control signal WLj a selection voltage, which is typically a high voltage, for example 13 volts.

As illustrated in FIG. 6, the second row control circuits MPLR2 include a second control circuit CPTL20 having, except for the exclusive NOR logic gate, a structure analogous to that of the first control circuit CPTL0.

More precisely, a NAND logic gate PL12, forming a second row decoding circuit receiving on an input connected to a second decoding input EDC2 a second decoding signal P0HVWL0, is connected on its other input to the first circuit input ECR12 itself connected to the output of the corresponding second latch device DISV2.

The output of the gate PL12 is connected to the input of a second inverter INV2, the output of which is connected to the circuit output SCR12 which delivers the second control signal WL0 (for the row 0).

Figure 7:
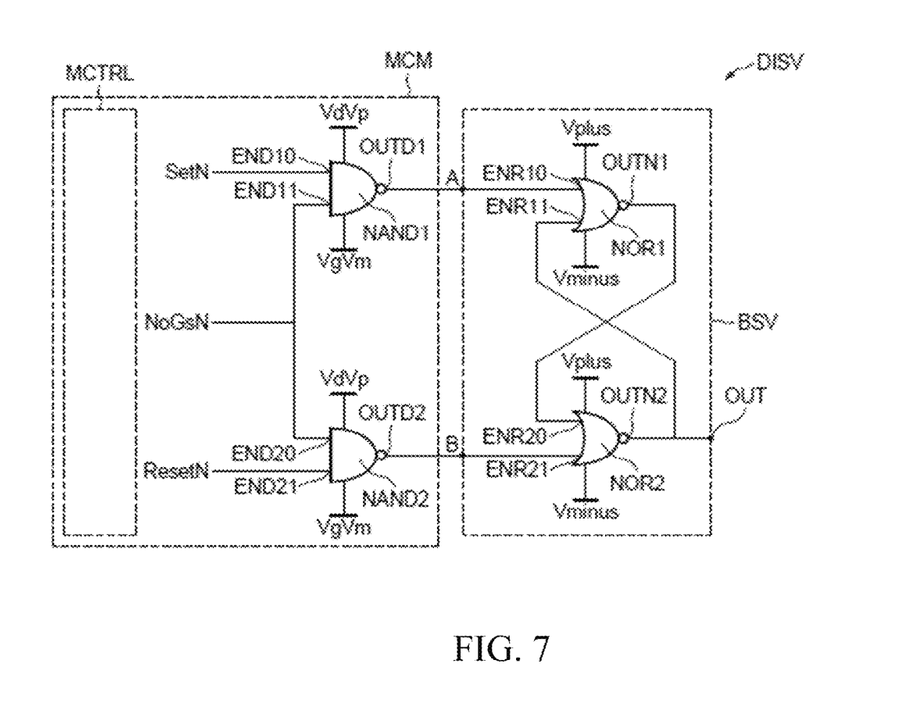
FIG. 7 is a schematic diagram of a latch device.

Although it is possible to use, for the latch devices DISV1 and DISV2, any type of latch device, for example a latch device of the SRAM type, it is particularly advantageous to use a latch device of the type of that described in the aforementioned French Application for Patent No. 2205502 and an exemplary embodiment of which is illustrated in FIG. 7.

This latch device DISV comprises a latch flip-flop of the SR type labelled BSV, powered between the first power supply voltage Vplus and the second power supply voltage Vminus and having a first flip-flop input A, a second flip-flop input B and a flip-flop output OUTN2 connected to the output terminal OUT.

Here, the flip-flop output OUTN2 forms the output terminal OUT of the device DISV.

The latch flip-flop BSV includes a first logic gate NOR1 and a second logic gate NOR2, which are NOR gates here.

The first logic gate NOR1 has a first gate input ENR10 coupled to the first flip-flop input A, a second gate input ENR11 and a first gate output OUTN1.

The second logic gate NOR2 has a first gate input ENR20 coupled to the first gate output OUTN1, a second gate input ENR21 coupled to the second flip-flop input B and the second gate output OUTN2 coupled to the second gate input ENR11 of the first logic gate NOR1 as well as to the flip-flop output OUT.

The device DISV also includes a control module MCM configured to position, in particular, the latch flip-flop BSV in a set state or in a reset state when the first power supply voltage Vplus has a first value Vdd which is less than the low voltage LV and which can be as low as the largest value between the threshold voltage of the NMOS transistors of the device and the absolute value of the threshold voltage of the PMOS transistors of the device, for example approximately 0.9 volts.

When the flip-flop BSV is positioned in its "set" or "reset" state, the control module is configured to confer the high voltage HV onto the first power supply voltage Vplus and the low voltage LV onto the second power supply voltage Vminus and make the high voltage HV or the low voltage LV be delivered and maintained on the flip-flop output OUTN2, according to the initial positioning state of the flip-flop.

In this respect, the control module is configured to simultaneously deliver at a time of delivery and later, to the two flip-flop inputs A and B, two input voltages corresponding in theory to a forbidden logic state, but in delivery conditions such that these two input voltages do not translate in reality for said flip-flop into the forbidden logic state.

The forbidden logic state is a state which translates into the simultaneous application of a setting ("set") and resetting condition to the two flip-flop inputs A and B.

In the example described, the flip-flop BSV includes NOR gates.

Consequently, the forbidden logic state translates in theory for such a flip-flop into the application of two voltages to the two flip-flop inputs seen by the NMOS transistors of the flip-flop, the gates of which are connected to these two flip-flop inputs A and B, as representative of a "1" logic state.

For example, the delivery conditions mentioned above (leading to this theoretical forbidden logic state not being translated in reality for the flip-flop into the forbidden logic state) include the satisfaction at said time of delivery and later of a relationship between the values of these two input voltages, the value of the second power supply voltage and the threshold voltage of the NMOS transistors of the flip-flop, the gate of which are connected to the two flip-flop inputs.

More precisely, the first and second logic gates NOR1 and NOR2 include NMOS transistors having their gate connected to the first flip-flop input A or to the second flip-flop input B and the control module is advantageously configured to deliver, when the flip-flop is positioned (in its set or reset state), starting from said time of delivery, on each flip-flop input, said corresponding input voltage having a value lower than the value of the second power supply voltage increased by the threshold voltage of the NMOS transistors.

These delivery conditions allow to obtain a gate-source voltage of these transistors lower than their threshold voltage, which blocks them and thus avoids the forbidden logic state of the flip-flop while avoiding the leaks of these NMOS transistors.

Physically, the control module includes for example a first NAND logic gate labelled NAND1, powered between a first auxiliary voltage VdVp and a second auxiliary voltage VgVm, and coupled at the output to the first flip-flop input A.

The control module also includes a second NAND logic gate labelled NAND2, powered between the first auxiliary voltage VdVp and the second auxiliary voltage VgVm, and coupled at the output to the second flip-flop input B.

The first NAND logic gate NAND1 has a first gate input END10 capable of receiving a logic signal SetN for setting the latch flip-flop, a second gate input END11 capable of receiving a control signal NoGsN, and a first gate output OUTD1 coupled to the first flip-flop input A.

The second NAND logic gate NAND2 has a first gate input END20 configured to receive the control signal NoGsN, a second gate input END21 configured to receive a logic signal ResetN for resetting the latch flip-flop, and a second gate output OUTD2 coupled to the second flip-flop input B.

The control module MCM also includes a control circuit MCTRL configured to, according to various operating phases of the latch flip-flop, assign a logic value to the control signal NoGsN, deliver the setting signal SetN in its active or inactive logic state, deliver the resetting signal ResetN in its inactive or active logic state and manage the values of the first power supply voltage Vplus, of the second power supply voltage Vminus, of the first auxiliary power supply voltage VdVp and of the second auxiliary power supply voltage VgVm.

This management, carried out, for example, in particular, by a state machine, includes a temporal sequencing of these various voltage values.

Figure 8:
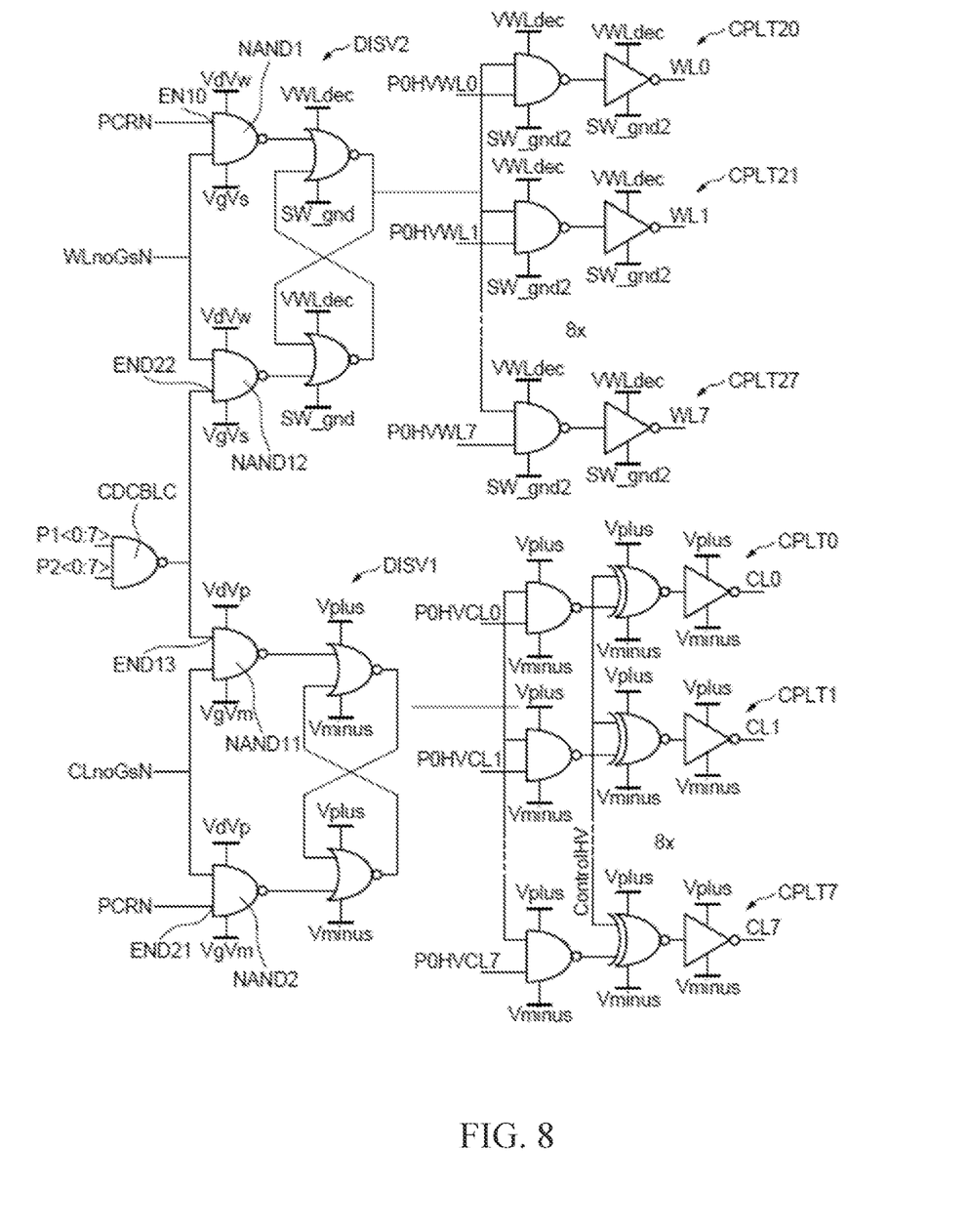
FIG. 8 illustrates use of the latch device of FIG. 7 in a circuit shown in FIG. 6.

FIG. 8 illustrates an example of use of these latch devices of FIG. 7 in a configuration of the type of that illustrated in FIG. 6.

More precisely, each first latch device DISV1 is controlled by the control signal CLnoGsN while each second latch device DISV2 is controlled by the control signal WLnoGsN.

These inputs END10 and END21 of the two NAND gates NAND1 and NAND2 respectively receive a resetting signal PCRN. The output of the NAND logic gate CDCBLC (which allows here to select a block of two devices DISV1 and DISV2 out of 64 blocks) is connected to the gate inputs END22 and END13 of the two NAND gates NAND12 and NAND11 of these two latch devices so as to set these devices.

The NOR gates of the latch device DISV2 and the gates of the control circuits CPLT20-CPLT27 are powered between the voltage VWLdec and the voltage SW_gnd2.

The invention claimed is:

1. A non-volatile memory device with a "split voltage" type architecture, comprising:
    a matrix memory plane including columns of memory words respectively formed on each row of the memory plane by groups of memory cells;
    wherein each memory cell includes a state transistor having a control gate and a floating gate and a selection transistor;
    wherein the state transistors for the memory cells of a memory word are controlled on the control gates by a control element, with all control elements of a same row being controlled by a first control signal generated by a first row control circuit;
    a first latch device of a set-reset (SR) type associated with the row and having an output terminal generating a latch signal that is input to the first row control circuit;
    a row decoder configured, when writing a piece of data in the memory word, to:
        select the row for storing the memory word and select the first row control circuit associated with the row that is selected;
        apply for the first control signal an erasing voltage corresponding to a first logic state of the first control signal; and
        then apply for the first control signal a programming voltage corresponding to a second logic state of the first control signal without modifying, between an erasing and a programming of the memory word, a logic state of the latch signal generated at the output terminal of the first latch device associated with the row that is selected; and
    a first control stage configured to deliver a voltage control signal, and wherein the first row control circuit includes a first control circuit having a first circuit input connected to the output terminal of the first latch device, a second circuit input configured to receive the voltage control signal and a first circuit output configured to deliver the first control signal, wherein the logic state of the first control signal depends on a voltage value of the voltage control signal.

2. The memory device according to claim 1, wherein said first control circuit comprises:
    a logic gate of an exclusive NOR type having a first gate input connected to said first circuit input, a second gate input connected to the second circuit input and a gate output; and
    a first inverter connected between the gate output and the first circuit output.

3. The memory device according to claim 1, wherein all selection transistors of the memory cells of the same row are controlled by a second control signal generated by a second latch device of a set-reset (SR) type associated with said row, wherein the row decoder is further configured, when programming a piece of data in a memory word, to select the row containing this memory word, and wherein the memory device comprises a second row control circuit, associated with said selected row and configured to, in order to program the piece of data in the memory word, confer onto the second control signal a selection voltage.

4. The device according to claim 3, wherein the second row control circuit includes a second control circuit having a first circuit input connected to the output terminal of the second latch device and a second circuit output configured to deliver the second control signal.

5. The memory device according to claim 4, wherein said second control circuit includes a second inverter having an output connected to the second circuit output.

6. The memory device according to claim 3,
    wherein the memory plane comprises R rows, and the memory device comprises:
        M first latch devices, each first latch device being associated with a block of N rows, R being equal to the product of N by M;
        as well as for each first latch device, N first row control circuits respectively associated with the N rows of the block of rows associated with this first latch device; and
    wherein the row decoder includes a block decoding circuit configured to select a first latch device out of the M first latch devices and a first row decoding circuit configured to select a row out of the N rows of the block of rows associated with the first latch device selected; and
    wherein each pair formed by the first latch device and the second latch device is associated with the same block of N rows, and the memory device includes for each second latch device N second row control circuits respectively associated with the N rows of the block of rows associated with this second latch device; and
    the row decoder includes, besides the block decoding circuit configured to select a pair of first and second latch devices out of the M pairs, a second row decoding circuit configured to select a row out of the N rows of the block of rows associated with the second latch device selected.

7. The memory device according to claim 6, wherein the block decoding circuit is connected to the setting input of each second latch device and the second row decoding circuit includes, in each second control circuit, a second logic gate having a first input connected to the first circuit input and a second input connected to a second decoding input configured to receive a row decoding signal and having an output connected to the second inverter.

8. The memory device according to claim 7:
   wherein the block decoding circuit is connected to a setting input of each first latch device and the first row decoding circuit includes in each first control circuit a first logic gate connected at a first input to the first circuit input and at a second input to a first decoding input configured to receive a row decoding signal, and connected at an output to the second gate input of the exclusive NOR logic gate; and
   wherein the first logic gate and the second logic gate are NAND gates.

9. A non-volatile memory device with a "split voltage" type architecture, comprising:
   a matrix memory plane including columns of memory words respectively formed on each row of the memory plane by groups of memory cells;
   wherein each memory cell includes a state transistor having a control gate and a floating gate and a selection transistor;
   wherein the state transistors for the memory cells of a memory word are controlled on the control gates by a control element, with all control elements of a same row being controlled by a first control signal generated by a first row control circuit;
   a first latch device of a set-reset (SR) type associated with the row and having an output terminal generating a latch signal that is input to the first row control circuit;
   a row decoder configured, when writing a piece of data in the memory word, to:
      select the row for storing the memory word and select the first row control circuit associated with the row that is selected;
      apply for the first control signal an erasing voltage corresponding to a first logic state of the first control signal; and
      then apply for the first control signal a programming voltage corresponding to a second logic state of the first control signal without modifying, between an erasing and a programming of the memory word, a logic state of the latch signal generated at the output terminal of the first latch device associated with the row that is selected;
   wherein the memory plane comprises R rows, and the memory device comprises:
      M first latch devices, each first latch device being associated with a block of N rows, R being equal to the product of N by M;
      as well as for each first latch device, N first row control circuits respectively associated with the N rows of the block of rows associated with this first latch device; and
      wherein the row decoder includes a block decoding circuit configured to select a first latch device out of the M first latch devices and a first row decoding circuit configured to select a row out of the N rows of the block of rows associated with the first latch device selected.

10. The memory device according to claim 9, wherein the block decoding circuit is connected to a setting input of each first latch device and the first row decoding circuit includes in each first control circuit a first logic gate connected at a first input to the first circuit input and at a second input to a first decoding input configured to receive a row decoding signal, and connected at an output to the second gate input of the exclusive NOR logic gate.

11. The memory device according to claim 1, wherein the first latch device is configured to, on command, deliver and maintain on the output terminal either a high voltage or a low voltage, and comprises:
   a first latch flip-flop of the SR type powered between a first power supply voltage and a second power supply voltage lower than the first power supply voltage and having a first and a second flip-flop inputs and a flip-flop output connected to the output terminal; and
   a control module configured:
      to position the first latch flip-flop in a set state or in a reset state when the first power supply voltage has a first value lower than the low voltage; and
      then position the latch flip-flop, to confer the high voltage onto the first power supply voltage and the low voltage onto the second power supply voltage and to simultaneously deliver starting from a delivery time, to the two flip-flop inputs, two input voltages corresponding in theory to a forbidden logic state, in delivery conditions such that these two input voltages do not translate in reality for said first flip-flop into the forbidden logic state, so as to deliver and maintain on the flip-flop output the high voltage or the low voltage.

12. The memory device according to claim 11, wherein the control module includes:
   a first NAND logic gate powered between a first auxiliary voltage and a second auxiliary voltage and having a first gate input connected to the output of the block decoding circuit, a second gate input configured to receive a third control signal, and a first gate output coupled to the first flip-flop input;
   a second NAND logic gate powered between the first auxiliary voltage and the second auxiliary voltage and having a first gate input configured to receive the third control signal, a second gate input configured to receive a logic signal for resetting the first latch flip-flop, and a second gate output coupled to the second flip-flop input;
   a control circuit configured, according to various operating phases of the first latch flip-flop, to assign a logic value to the third control signal, deliver the resetting signal in its inactive or active logic state and manage values of the first power supply voltage, the second power supply voltage, the first auxiliary power supply voltage and the second auxiliary power supply voltage.

13. The memory device according to claim 11, wherein all selection transistors of the memory cells of the same row are controlled by a second control signal generated by a second latch device of a set-reset (SR) type associated with said row, and wherein the second latch device has an architecture similar to that of the first latch device.

14. The memory device according to claim 1, wherein the memory device is of an EEPROM type.

15. A non-volatile memory device, comprising:
   a matrix memory plane including memory cells;
   wherein each memory cell includes a state transistor having a control gate and a floating gate and a selection transistor;
   a latch circuit for each row of the matrix memory plane;
   a control element having an input and an output, wherein the input is configured to receive a first control signal, and wherein the output is connected to control gates of the state transistors associated with a memory word location in a row of the matrix memory plane;

a first row control circuit coupled to an output of the latch circuit and configured to generate the first control signal;

wherein the first row control circuit comprises:

a logic gate of an exclusive NOR type having a first gate input coupled to receive a signal derived from an output of the latch circuit set in response to selection of the row of the matrix memory plane and a second gate input coupled to receive a signal derived from the address; and a first inverter having an input coupled to an output of the logic gate and an output producing the first control signal;

wherein, in write mode, the first control signal has an erasing voltage corresponding to a first logic state of the first control signal during an erasing operation on the memory word location and then has a programming voltage corresponding to a second logic state of the first control signal during a programming operation on the memory word location; and wherein an output of the latch circuit does not change state between the erasing operation and the programming operation.

16. The memory device according to claim 15, wherein the output of the latch circuit is set in response to an address decoding.

17. The memory device according to claim 15, further comprising:

a further latch circuit for each row of the matrix memory plane;

a second row control circuit coupled to an output of the further latch circuit and configured to generate a second control signal applied to control gates of the selection transistors of the memory cells of the row.

* * * * *